July 21, 1959 F. H. RAYMOND ET AL 2,896,082
ELECTRIC SIMULATORS OF ARBITRARY FUNCTIONS
Original Filed May 22, 1952 8 Sheets-Sheet 1

INVENTORS
FRANCOIS HENRI RAYMOND
PIERRE FRANÇOIS LOUIS CHAPOUILLE  JACQUES EDOUARD MARTIN
BY
ATTORNEY

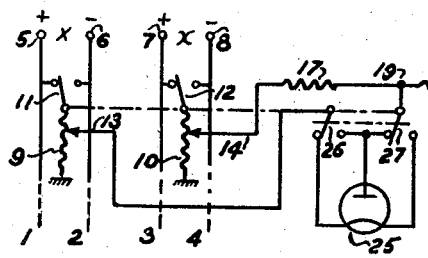
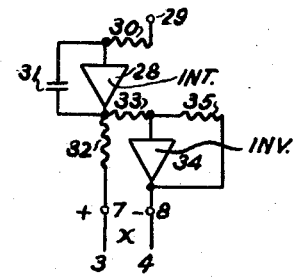
Fig.3　　　　　　　Fig.4
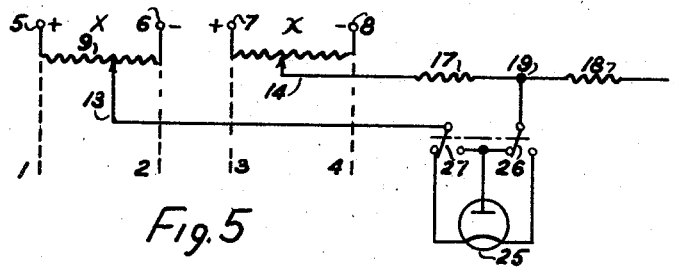
Fig.5
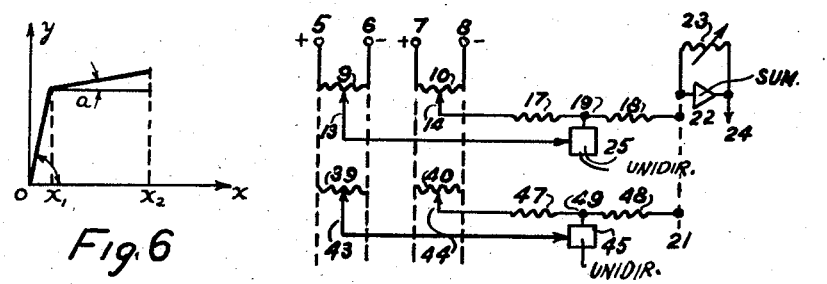
Fig.6　　　Fig.7
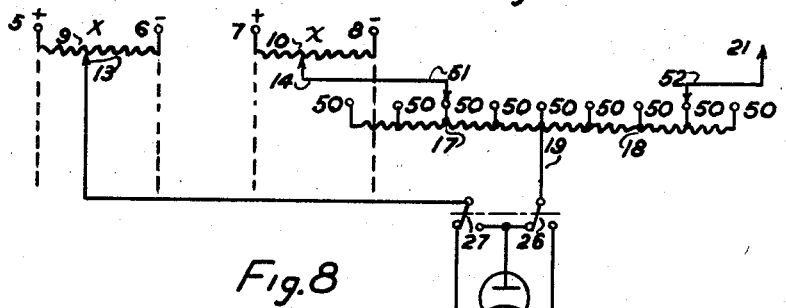
Fig.8
INVENTORS
FRANCOIS HENRI RAYMOND
PIERRE FRANCOIS LOUIS CHAPOUILLE  JACQUES EDOUARD MARTIN
BY
ATTORNEY

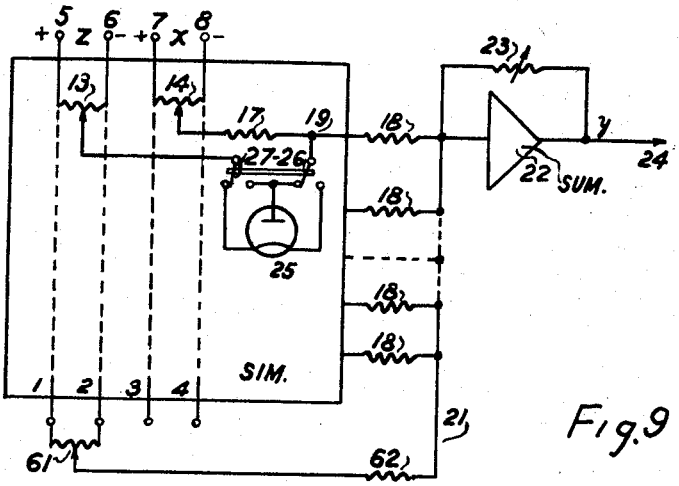
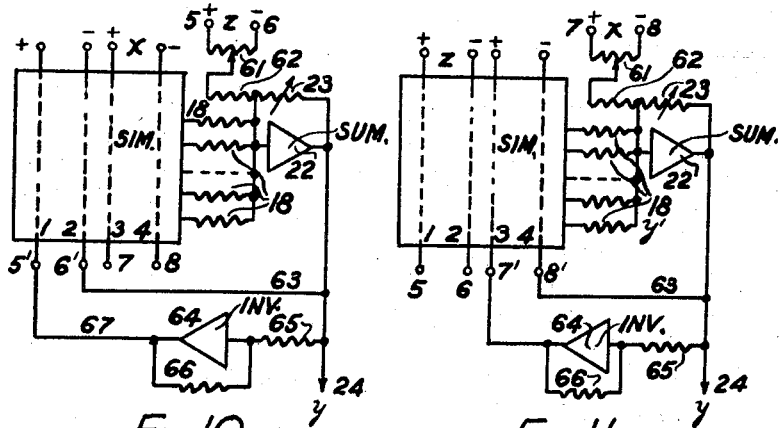
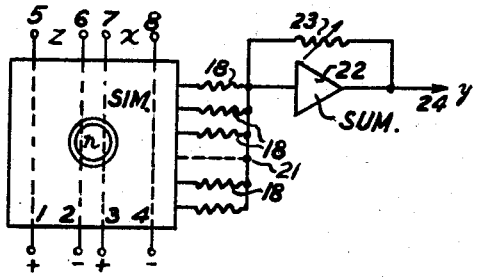
Fig.12

July 21, 1959     F. H. RAYMOND ET AL     2,896,082
ELECTRIC SIMULATORS OF ARBITRARY FUNCTIONS
Original Filed May 22, 1952     8 Sheets-Sheet 6

INVENTORS
FRANÇOIS HENRI RAYMOND
PIERRE FRANÇOIS LOUIS CHAPOUILLE  JACQUES EDOUARD MARTIN
BY
ATTORNEY

July 21, 1959     F. H. RAYMOND ET AL     2,896,082
ELECTRIC SIMULATORS OF ARBITRARY FUNCTIONS
Original Filed May 22, 1952     8 Sheets-Sheet 8
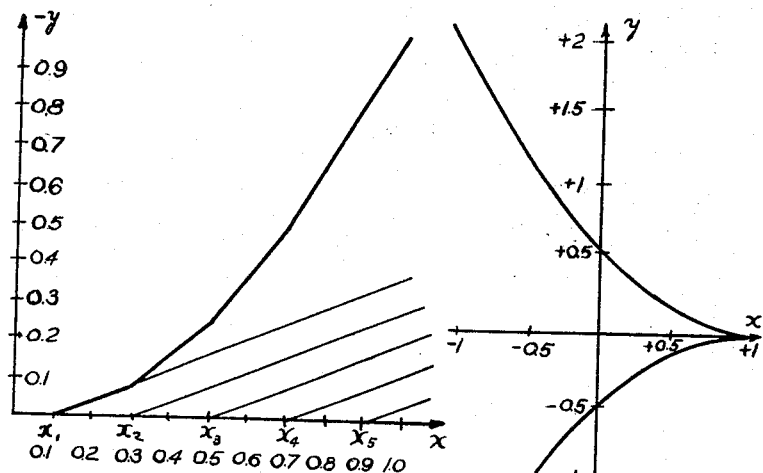
Fig.22
Fig.25
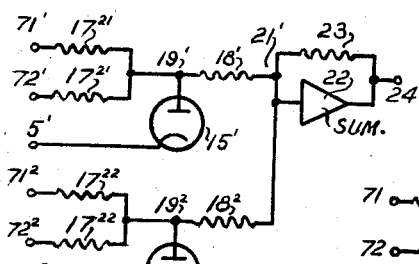
Fig.27
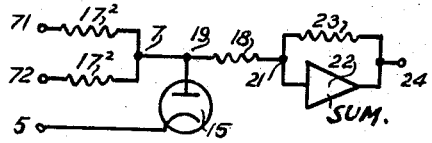
Fig.26
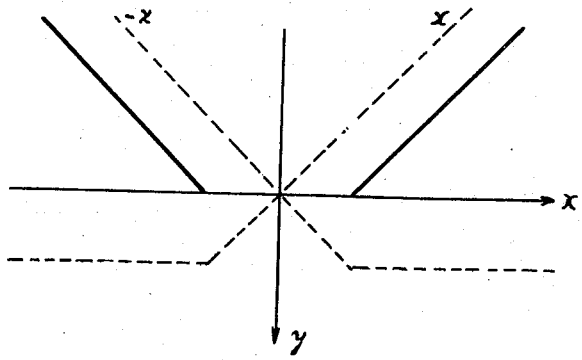
Fig.28
INVENTORS
FRANÇOIS HENRI RAYMOND –
PIERRE FRANÇOIS LOUIS CHAPOUILLE – JACQUES EDOUARD MARTIN
BY
ATTORNEY

United States Patent Office 2,896,082
Patented July 21, 1959

2,896,082

ELECTRIC SIMULATORS OF ARBITRARY FUNCTIONS

François Henri Raymond, Saint-Germain-en-Laye, Pierre François Louis Chapouille, Montfermeil, and Jacques Edouard Martin, Paris, France, assignors to Societe d'Electronique et d'Automatisme, Courbevoie, Seine, France Original application May 22, 1952, Serial No. 290,588, now Patent No. 2,831,107, dated April 15, 1958. Divided and this application April 14, 1958, Serial No. 728,483

Claims priority, application France May 28, 1951

12 Claims. (Cl. 250—27)

The present invention is a division of the disclosure of Ser. No. 290,588, Patent No. 2,831,107, entitled Electric Simulators of Arbitrary Function, and filed on May 22, 1952, by Francois H. Raymond, Pierre F. L. Chapouille and Jacques E. Martin, relates to electric simulators of arbitrary functions, i.e. electric devices to which may be given any transfer characteristic corresponding to an arbitrary, though adjustable, law of variation of a geometrical curve which has been previously reduced, by graphical analysis, to a combination of elementary functions each of which represents a portion of a right line starting from the origin with a determined slope. A transfer characteristic denotes the curve obtained by plotting the values of an output voltage, in ordinates, against the values of, at least, one input voltage, as abscissae.

Electric simulators of arbitrary functions according to the invention may be used either as voltage generators of arbitrary functions, or as electrical tables of arbitrary functions, or else as computers for effecting analogue computation with electrical variables.

In the attached drawings:

Fig. 3 shows an alternative of part of the diagram of Fig. 2;

Fig. 4 shows a generator of a voltage regularly increasing with the time, used for the explanation of the operation of an electric simulator such as shown in Fig. 2;

Fig. 5 shows an alternative of part of the diagram of Fig. 2;

Fig. 6 shows an alternative to part of the curve B of Fig. 1;

Figs. 7 and 8 show respective alternatives to parts of the diagram of Fig. 2, in accordance with a function of the kind shown in Fig. 6;

Fig. 9 shows an alternative embodiment to the diagram of Figs. 2 and 3, for impressing a linear transfer law on the general transfer law to which an electric simulator has been adjusted;

Figs. 10 and 11 show respective feedback arrangements for an electric simulator according to the invention;

Fig. 12 shows the electrical representation of a parabolic transfer law by means of a simulator according to the invention;

Fig. 22 shows the parabolic transfer characteristic of an electrical simulator according to the invention and comprising five elementary stages of the kind disclosed in Fig. 20 in an overall arrangement in accordance with Fig. 2;

Fig. 25 shows in combination two parabolic transfer characteristics of two simulator units which are associated in accordance with the arrangement of Fig. 24;

Fig. 26 shows part of an alternative diagram which ensures, in simulator arrangements such as those of Figs. 2 and 16, the input summation of two electrical quantities;

Fig. 27 shows an alternative diagram of that disclosed in Fig. 26;

Fig. 28 shows a complete transfer characteristic which may be given to an elementary simulator of the kind disclosed in Fig. 27, to operate mainly in a two-unit arrangement for the computation of the product of two separate electrical quantities.

For a single variable $x$, an electric simulator of an arbitrary function $y=f(x)$ will deliver, for any value $x_i$ of its input voltage, an output voltage $y_i=f(x_i)$.

Figure 1:
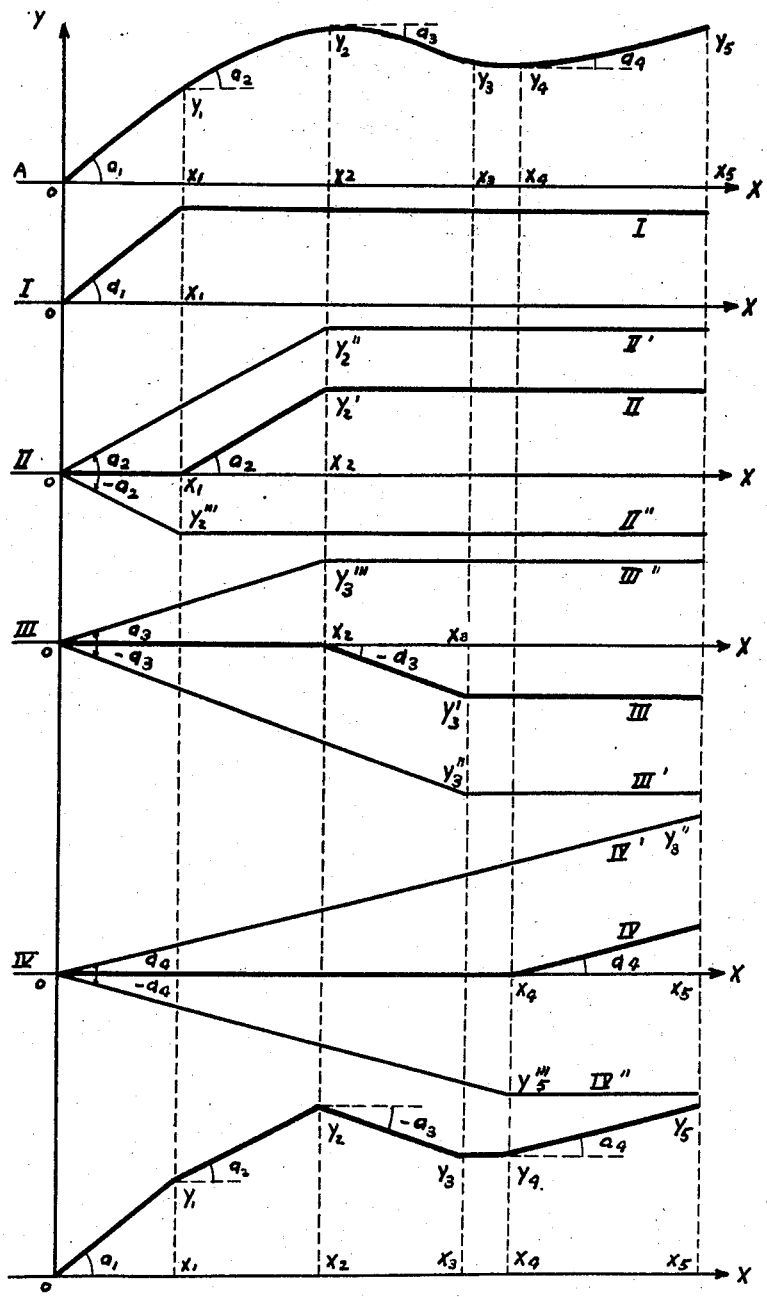
Fig. 1 shows reduction diagrams of an arbitrary function A for the elaboration of an arbitrary function B which is a good approximation of the function A, right line portions being substituted to curved line portions.

Considering for instance an arbitrary function such as drawn at A in Fig. 1, a good approximation of this function may be obtained by so cutting the $Ox$ abscissae axis that, between the points of abscissae $O$, $x_1$, $x_2$, $x_3$, $x_4$, $x_5$, the curved portions $Oy_1$, $y_1y_2$, $y_2y_3$, $y_3y_4$, $y_4y_5$ of curve A can be replaced by the straight line portions of the same numerical references of curve B, of respective slopes $a_1$, $a_2$, $-a_3$, zero, $a_4$ with respect to axis $Ox$. The values of abscissae $x_1 \ldots x_5$ and the values of slopes $a_1 \ldots a_4$ can be easily determined by any user of the graphical representation of the function A. The same considerations apply to any kind of arbitrary functions.

From a graphical point of view, curve or function B results from the summation of curves I to IV.

Curve I linearly increases from $O$ to $y_1$ with a slope $a_1$. The relation is $y_1=x_1.\tan a_1$. From point $y_1$, this curve remains at the ordinate $y_1$ for any value of abscissa higher than $x_1$.

Curve II remains at zero ordinate until $x=x_1$. Then this curve linearly increases, from $x_1$ to $x_2$, and reaches an ordinate $y'_2=(x_2-x_1).\tan a_2$. This value of ordinate is then preserved for any value of $x$ higher than $x_2$.

Curve III remains at zero ordinate until $x=x_2$ and then linearly increases, in the negative direction of ordinates until $x=x_3$, to reach an ordinate $y'_3=(x_3-x_2).\tan a_3$. Curve III then remains at this ordinate value for any value of $x$ higher than $x_3$.

Curve IV remains at zero ordinate until $x=x_4$. It then increases until $x=x_5$ and reaches the ordinate value $y'_5=(x_5-x_4).\tan a_4$. This value of ordinate is preserved for any value of abscissa higher than $x_5$.

Always, however, from a graphical point of view, each of curves II, III, IV, results from the algebraic composition of two curves, both starting from origin $O$, and having slopes of reversed sign; each right line portion is terminated at a distinct value of $x$, and continued by a right line parallel to the axis $Ox$.

Curve II results from the summation of two curves, II'—II'', starting each from origin $O$ with opposite slopes $a_2$ and $-a_2$. The linear portion of slope $-a_2$ reaches ordinate $y''_2$ when $x=x_2$. This ordinate $y''_2=x_2.\tan a_2$ is preserved for any higher value of the abscissa. The linear portion of slope $-a_2$ reaches ordinate.

$$-y'''_2=x_1.\tan -a_2$$

when $x=x_1$. This ordinate is preserved for any higher value of $x$.

Curve III results from the summation of two curves, III'—III'', starting each from origin O with opposite slopes $a_3$ and $-a_3$. The linear portion of slope $a_3$ reaches ordinate $y'''_3$ for $x=x_2$. This ordinate value is preserved for any higher value of $x$. Apparently $$y'''_3=x_2.\tan a_3$$

The linear portion of slope $-a_3$ reaches ordinate value $-y''_3=x_3.\tan-a_3$ and this ordinate value is preserved for any value of $x$ higher than $x_3$.

Curve IV also results from the summation of two curves, IV'—IV'', each starting from origin O with respective slopes $a_4$ and $-a_4$. The linear portion of slope $a_4$ reaches ordinate value $y''_5=x_5.\tan a_4$ and this ordinate value is preserved for any higher value of $x$.

The graphical curve B thus results from the summation of the curves I, II', II'', III', III'', IV', IV''.

Now, from an electrical point of view, any component curve comprising a linear portion starting from origin O with a determined value of slope until a definite ordinate value is reached for a predetermined abscissa value, and then remaining at such ordinate value for any higher value of abscissa, may be simulated by an electric voltage the amplitude of which is varied according to such a law under the control of an input signal voltage. Such a simulation voltage consists of the output voltage of an electric circuit which, upon receiving an input voltage $x$, of increasing magnitude for instance, delivers an output voltage which increases at a constant ratio with respect to the input voltage until this input voltage reaches a predetermined magnitude; this circuit has a higher threshold of response by which the output voltage is permanently limited at a definite level. Denoting $x$ the input voltage and $y$ the output voltage, the transfer characteristic of such a circuit represents the relations:

$$y=x.\tan.a \text{ with } O \quad x \quad x_i$$
$$y=y_i \text{ with } x \quad x_i$$

When such a circuit, instead of receiving a variable input voltage, receives an input voltage of definite value, it will deliver an output voltage representing the corresponding ordinate value on its transfer characteristic; for any value of the input voltage lower than $x_1$, the output voltage will represent $y_m=x_m.\tan a$, $x_m$ designating any input voltage lower than $x_1$; for any value $x_n$ higher than $x_1$ of the input voltage, the output voltage will remain at the value $y_1$.

From a more general point of view, for any input voltage of value $x$ which varies in accordance to any law, the output voltage will vary in such a manner that its corresponding point will be displaced on the transfer characteristic of the circuit.

It can be stated that an electric circuit simulating the relations (1) comprises a transfer network including an arrangement for multiplying the input voltage by a constant coefficient, tan $a$, and also a limiter arrangement for the output voltage adjusted at a constant threshold value $y_i=x_i.\tan a$. As known, a multiplier arrangement for an electrical voltage may consist of a potentiometer across which is applied the input voltage and the adjustable tap or slider of which is adjusted to reduce this voltage at the ratio indicated by that coefficient, the output voltage being derived from the adjustable tap. As also known, a limitation to a predetermined value of a voltage carried by an electrical conductor or lead may be ensured by the provision of a unidirectional conductibility element, such as a diode or a dry or cristal rectifier, in shunt between the conductor and a point of fixed, though adjustable, bias voltage so that the voltage carried by the conductor is limited to the bias voltage value as soon as the unidirectional elements becomes conductive.

Figure 2:
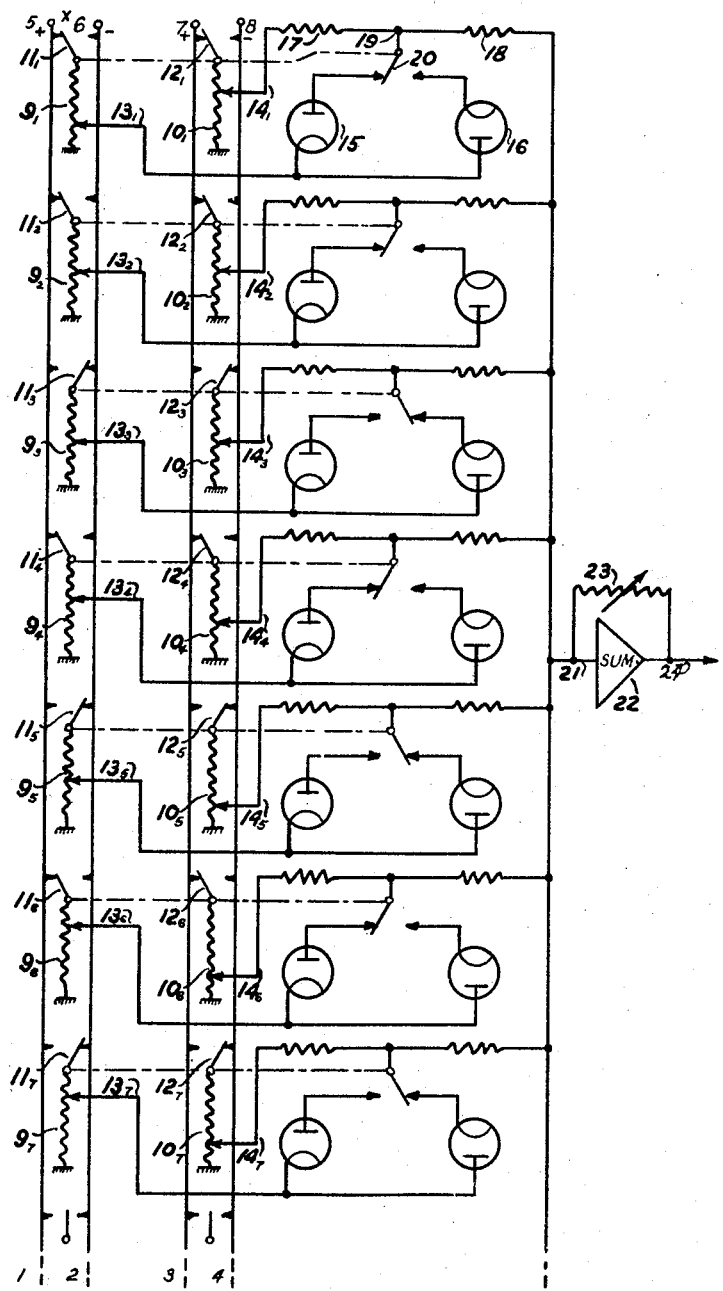
Fig. 2 shows a first electric diagram of an electric simulator of arbitrary functions in accordance with the invention, for the electrical representation or simulation of the function B in Fig. 1.

Fig. 2 shows a first diagram of an electric simulator of arbitrary functions according to the invention, for the case graphically indicated in Fig. 1. Such a simulator will incorporate seven stages or networks.

A first pair of feeders 1—2 is provided for the application upon their respective terminals 5—6, of a D.C. reference voltage denoted X, of higher value than the maximum value of variable voltage $x$, or the maximum value of output voltage $y$. Terminal 5 receives the reference voltage in positive polarity and terminal 6, in negative polarity.

A second pair of feeders 3—4 is provided for the application upon their respective terminals 7—8 of the D.C. variable voltage $x$, in respective opposite polarities.

Adjustment potentiometers corresponding in number to that of the elementary stages, are operatively associated with each pair of feeders, 1—2 and 3—4. Potentiometers $9_1$ to $9_7$ are associated with feeders 1—2 and potentiometers $10_1$ to $10_2$ are associated with feeders 3—4.

Each of potentiometers 9, through an inverter switch contact 11 can be connected to one or the other of feeders 1—2. Each of potentiometers 10, through an inverter contact 12 can be connected to one or the other of feeders 3—4.

The slider 13 of each potentiometer 9 is connected to the cathode of a diode 15 and to the plate of a diode 16. Instead of diodes, germanium cristals may be used.

The bias or reference voltages are adjusted by means of potentiometers 9. The sliders 13 are so placed that the following coefficients are preset:

Slider $13_1$ upon potentiometer $9_1$ which receives reference voltage $+X$ through inverter $11_1$, represents coefficients $y_1=x_1.\tan a_1$ corresponding to Section I of Fig. 1;

Slider $13_2$ upon potentiometer $9_2$, which receives reference value $+X$ through inverter $11_2$, represents coefficient $y''_2=x_2.\tan a_2$, corresponding to the upper component of section II of Fig. 1;

Slider $13_3$ upon potentiometer $9_3$, which receives reference voltage $-X$ through inverter $11_3$, represents coefficient $y'''_2=x_1.\tan-a_2$, corresponding to the lower component of section II of Fig. 1;

Slider $13_4$ upon potentiometer $9_4$, which receives reference voltage $+X$ through inverter $11_4$, represents coefficient $y''_3=x_2.\tan a_3$, corresponding to the upper component of section III of Fig. 1;

Slider $13_5$ upon potentiometer $9_5$, which receives reference voltage $-X$ through inverter $11_5$, represents coefficient $y''_3=x_3.\tan-a_3$, corresponding to the lower component of section III of Fig. 1;

Slider $13_6$ upon potentiometer $9_6$, which receives reference voltage $+X$ through inverter $11_6$, represents coefficient $y''_5=x_5.\tan a_4$, corresponding to the upper component of section IV of Fig. 1;

Slider $13_7$ upon potentiometer $9_7$, which receives reference voltage $-X$ through inverter $11_7$, represents coefficient $y'''_5=x_4.\tan-a_4$, corresponding to the lower component of section IV of Fig. 1.

These adjustments define the bias voltages for diodes 15 and 16, i.e., the threshold values of operation of these diodes. The selection of the operative diodes in pairs 15—16 is automatically ensured by adjustment of inverters 11 which are mechanically ganged inverters 20 controlling the connection of each pair of diodes to the corresponding transfer network.

The slider 14 of each of the potentiometers 10 is connected to a transfer network constituted by two series resistors 17 and 18, preferably of equal values and the junction point 19 of these resistors is connected to the armature of the corresponding inverter contact 20. As mentioned above, inverters 20 are ganged with inverters 11 and, preferably, also with inverters 12. In certain cases as will be seen further below, such ganging is disadvantageous.

The mechanical ganging links are indicated at 25.

For the above-described conditions of inverters 11, and in accordance with the mechanical coupling of the inverters potentiometers $10_1$, $10_2$, $10_4$, and $10_6$ will receive the variable input voltage $x$ in its positive polarity and potentiometers $10_3$, $10_5$ and $10_7$ this input voltage $x$ in its negative polarity. Furthermore diodes 15 will be operative in the first, second, fourth and sixth stages and diodes 16 will be operative in the third, fifth and seventh stages.

In the example which has been given in Fig. 1, the further following adjustments are made:

In potentiometer $10_1$, slider $14_1$ receives coefficient tan $a_1$;

Potentiometers $10_2$ and $10_3$, sliders $14_2$ and $14_3$, respectively, receive coefficient tan $a_2$;

In potentiometers $10_4$ and $10_5$, sliders $14_4$ and $14_5$, respectively, receive coefficient tan $a_3$;

In potentiometers $10_6$ and $10_7$, sliders $14_6$ and $14_7$, respectively, receive coefficient tan $a_4$;

Points 19 may be considered as output points for the multiplying arrangements in the transfer networks, resistors 18 constituting, together, an input resistance mixer for a summation amplifier of all the individual output voltages. This summation amplifier comprises a voltage amplifier 22 provided with a feedback resistor 23 which is made adjustable. It is so established as to maintain a linear ratio between its output voltage at 24 and its input voltage at 21.

According to the numerical example of Fig. 1, no slope higher than 45° exists, hence no tangent higher than 1; the adjustments of the potentiometers can be readily received and the value of resistor 23 of the summation amplifier is adjusted to 2R, R denoting the value of all and any of resistors 17 and 18. The case of slopes higher than 45° will be considered further below.

In order to explain the operation of the device shown in Fig. 2, this device will now be considered as a voltage generator, its output voltage reproducing the variation in time of curve B in Fig. 1. In such a case, the voltage $\pm x$ applied to the input terminals 7—8 must increase with time. For instance, and for the sake of illustration, only such a voltage may be derived from an arrangement not included in the invention, and shown in Fig. 4 in the form of a Niller integrator circuit. This circuit comprises an amplifier stage 28 designed with a feedback condenser 31; its input receives from a terminal 29 through a series resistance 30 a constant D.C. voltage. The output of this otherwise conventional amplifier is connected to input terminal 7 of feeder 3(+) through a balancing resistor 32. From another balancing resistor 33, the same output voltage is applied to the input of a polarity inverter stage 34 designed with a negative feedback loop comprising a resistor 35 of the same value as resistor 33. The output of inverter stage 34 is connected to input terminal 8 of feeder 4(−).

At the starting condition, none of diode 15 or 16 is conducting, diodes 15 receiving a positive bias on their cathodes and diodes 16, a negative bias on their plates.

The variable voltage $\pm x$ increases. The positive voltage derived from potentiometer $10_1$ increases according to $x.\tan a_1$. When the value of the voltage at 19 equals the bias voltage $x_1.\tan a_1$ applied to the cathode of diode 15 in the first transfer network, this diode begins to conduct and thus acts as a limiter element for the voltage at point 19 of the first stage, to a value $y_1$. The transfer characteristic of the first stage is then that shown at I in Fig. 1.

The voltages in the other stages follow similar transfer laws in accordance with component curves II′—II″, III′—III″, IV′—IV″ of Fig. 1.

The voltage at point 21 results from the mixing of the seven individual voltages derived from the different stages and the summation amplifier translates the resulting voltage to output lead 24 with a linear ratio between its own input to output voltages, so that the voltage $F(x)$ on lead 24 varies in accordance with curve B, Fig. 1, which represents the overall transfer characteristic of the device.

Omitting the arrangement shown in Fig. 4, and considering a variable voltage $x$ of any arbitrary value, the output voltage of the summation amplifier will also result from the summing of the individual output voltages from the stages. The ordinate value $y$ will correspond to the abscissa value $x$. The transfer characteristic of the device remains unchanged whether this device is used as a function generator (dynamic operation), or as a function table (static or discontinuous operation). A third use of such a device is apparent from the two first. In this case, the input terminals of the variable voltage feeders receive a permanent or continuous voltage the amplitude of which changes in an arbitrary function of time: such a voltage will be translated by passing through the device in such a manner that, at any instant, an output voltage will be of such a value as indicated on curve B for the corresponding value (abscissa) of the input voltage.

Modifications may be applied to the circuit components of Fig. 2 without departing from the scope of this disclosure. For instance, as shown in Fig. 3, a single diode or rectifier 25 may be substituted for each pair of diodes 15—16, and contact inverter 20 be replaced by the two inverters 26 and 27 for the simultaneous change-over of the connections from slider 13 and point 19, from cathode to plate and from plate to cathode of diode 25 and vice-versa.

As shown in Fig. 5, potentiometers 9 and 10 may also be connected between feeders 1—2 and 3—4, inverters 11 and 12 being omitted. The sliders 13 and 14 may be adjusted on either side of the electrical mid-point of these potentiometers. This mid-point presents a zero potential since the ends of said potentiometers receive balanced voltages $\pm x$ and $\pm x$.

When it becomes necessary, in the graphical reduction of an arbitrary function to its components, to make use of linear portions having slopes higher than 45°, the general arrangement may be preserved provided certain changes are made in the adjustments of the resistor values.

Fig. 6 illustrates the start of a curve B wherein the first linear portion, from origin O, presents a slope $10a$, of a very high value with respect to slope $a$, of the following portion. The value of the slope $10a$ is higher than 45° and can reach a value in the neighborhood of 87°, while slope $a$ is lower than 45°: tan $10a$ can reach a value of twenty, tan $a$ remains lower than unity. The simulation of such a curve B may be obtained with the arrangement of Fig. 2, wherein the value of any and all of resistors 17 and 20 is preserved at a single value, R, but the original value 2R of resistor 23 in the summation amplifier is multiplied by the maximum value of the tangent of the highest slope, tan $a_{max}$, so that the value of resistor 23 is equal to $2R.\tan a_{max}$. Furthermore, the values to which are adjusted the sliders of potentiometers 9 and 10 are divided by this value of maximum tangent. Denoting $a_j$ the value of a slope $(j=1,2,3,\ldots,n)$ and $x_j$ the value of an abscissa $(i=1, 2, 3, \ldots, m)$ the slider of any potentiometer 10 is adjusted to a coefficient tan $a_j/\tan a_{max}$ lower than unity, and on any potentiometer 9, the slider is adjusted to a coefficient value $x_1.\tan a_j/\tan a_{max}$. From a graphical point of view, this represents a reduction of all the slopes and all the ordinates of the component curves, hence a reduction of the entire curve. From an electrical point of view, this represents a corresponding reduction of all the electric component voltages at input 21 of the summation amplifier. On the other hand, the multiplication by tan $a_{max}$ of the value of resistor 23 of summation amplifier represents an increase of its transfer coefficient from unity to tan $a_{max}$, so that the ratio of the output-to-input voltages of this amplifier is brought to tan $a_{max}$, whereby a compensating expansion is obtained, in the amplitude levels derived from the output of this amplifier.

Alternatively, having adjusted to $2R.\tan a_{max}$ the value of resistor 23, it is provided to maintain at value R, only those of resistors 17—18 which are included in transfer networks for which adjustments are to be made to reduced coefficient values tan $a_1$/tan $a_{max}$, i.e., those transfer stages for which the slopes are higher than unity. The other resistors 17—18, in those stages for which the slope values are lower than unity, or equal to unity, are adjusted to a value $R.\tan a_{max}$. These adjustments provide the level reduction at the input of the summation amplifier both through a reduction of coefficients for the first group of transfer stages and through an output voltage reduction for the other group.

Simulator circuits according to the invention may be provided with two groups of such transfer stages. Fig. 7, for instance, shows one transfer stage in each group: the first transfer network, from 9 to 25, is the same as described above; its resistors 17 and 18 have the value R, and its potentiometers are adjusted to reduced coefficients for a portion of linear curve which presents a slope higher than 1. The second transfer network, from 39 to 48, of the same circuit arrangement, is established with resistors 47 and 48 adjusted to the value $R.\tan a_{max}$, and its potentiometers adjusted to the true coefficients for a linear portion of slope lower than unity.

Alternatively, as shown in Fig. 8, all resistors 17 and 18 consist of tapped potentiometers with input and output sliders 51 and 52 for the adjustments of their resistance values inserted in the transfer networks. A pair of taps may suffice, but, considering a large scale of slopes, extending for instance from 0 to 1, then from 1 to 10, and then from 10 to 20 for their tangents, and resistor 23 being adjusted to the value $2R.\tan a_{max}$ and resistances of the stages relating to coefficients reduced by 1/tan $a_{max}$ being of the value R, at least one intermediate value may be provided: the value $R.\tan a_{max}$ is preserved for those of the transfer networks which are adjusted to true coefficients from 0 to 1 and an intermediate value $R.\tan a_{in}$/tan $a_{max}$ is provided for the transfer stages which are to be adjusted to coefficients reduced by tan $a_{in}$/tan $a_{max}$, tan $a_{in}$ denoting an intermediate value between 1 and the maximum value, for instance between 1 and 20, e.g. 10.

Now, it is to be noted that, in an electric simulator according to the invention, any change in the reference value $\pm X$ of the reference voltage will vary the value of the predetermined level $y_i$ for a given abscissa value $x_1$ which is also modified since their ratio remains constant.

Considering such reference voltage as a second variable voltage, denoted $z$, the true relation between the three quantities $y$, $z$ and $x$, is:

(2) $\quad y = z.f(x/z)$ the arbitrary function $y$ is a function of two variables $x$ and $z$, and the same is true for any elementary function which is a component of a complex arbitrary function $y$. If the reference voltage is varied, the simulator arrangement will define a family of homothetic curves from the origin, in other terms a mathematical surface.

The only change brought to the arrangements shown lies in the connection of feeders 5—6 to a second variable voltage $z$ instead of a reference voltage.

Referring to Fig. 9, for instance, the component elementary function to which is adjusted the specific transfer network represents a relation $y = x.\tan a_1$. The slider 14 is adjusted to a coefficient value tan $a_1$ and the slider 13 is adjusted to a coefficient value which, multiplied by a reference value, $z_0$, of the second variable voltage, results in the application on contact 27 of a voltage $y_{1.max}$ equal to $x_{1.max}.\tan a_1$, $y_{1.max}$ denoting the maximum output voltage of the transfer network concerned and $x_{1.max}$ the value of the input voltage resulting in such output voltage for reference value $z_0$ of the second variable.

Any change or variation in the value of voltage $\pm z$, once these adjustments are made for the value $z_0$, results in a modification of length of the sloping portion of each component function without varying the coefficient tan $a_1$. The length of this sloping portion, and, therefore, the values of $y_{1.max}$ and $x_{1.max}$ are linearly varied in accordance with the variation of the second variable $z$, and according to Relation 2. The function $f(x/z)$ is such that for $x=0$, $f(0)=0$.

In an electric simulator of arbitrary functions according to the invention, the displacement of orign, if required, was made by introducing an additional constant voltage is the only variable. In an electric simulator of arbitrary functions of two variables, $x$ and $z$, such a shift may be obtained by means of an additional potentiometer 61, Fig. 9, between feeders 1—2 of the reference (second variable) voltage $z$. This potentiometer, from its slider, feeds an additional resistor 62 of the input mixer of the summation amplifier. Denoting $b$ the coefficient adjusted on said potentiometer, the above Relation 2 becomes:

(3) $\quad y = z(b + f(x/z))$ and for $x=0$, $y=b.z$.

If, on the other hand, the additional potentiometer is introduced between feeders 3—4, Relation 2 will become:

(4) $\quad y = z(bx/z + f(x/z))$ and for $x=0$, $y=0$.

Now, one of the variable voltages, $x$ and $z$, may be introduced in the input resistor mixer of the summation amplifier, the output of which is fed back to the feeders corresponding to the introduction of such variable voltage in the input of the simulator.

In Fig. 10, for instance, variable voltage $z$ is applied upon an additional resistor 62 of the input mixer of the summation amplifier. The value of resistor 62 is made equal to the value of any resistor 18, for a slope lower than 45°. The $z$ voltage is only applied to the terminals 5—6 of an additional potentiometer 61 adjusted to a $b$ coefficient. The input terminals $5^1$ and $6^1$ of feeders 1 and 2 are then connected to output 24 of the summation amplifier. If, for instance, this output connection is unipolar, conductor 63 is provided for connecting output 24 to terminal $6^1$ and an inverter stage 64 is inserted in conductor 67 extending from output 24 to terminal $5^1$. Such an inverter stage, which presents a gain ($-1$), may consist of a high gain amplifier receiving the input signal through a series resistor 65 and provided with a feedback resistor 66 of the same value as 65 from output to input.

The variable voltage fed to feeders 1—2 is thus equal to the output voltage $y$ of the simulator. This output voltage is the sum of the voltage $y_1$ resulting from the algebraic addition of all the individual output voltages from the transfer networks and of the voltage $z$ of the second variable input. The first variable voltage $x$ remains on feeders 3—4 for its application to the simulator.

In accordance with Relation 2, we have:

(5) $\quad y_1 = y.f(x/y)$ with (6) $\quad y_1 + b.z = -y/A$

A denoting the gain of the summation amplifier and, when such gain is of a high value, (7) $\quad y_1 = -b.z$ Adjusting $b=-1$, and substituting $y_1$ from (7) in Relation 5:

(8) $$z/y = f(x/y)$$

which also can be written, considering the reverse function (9) $$x/y = f^{-1}(z/y)$$

Relation 9 shows that, in an electric simulator according to Fig. 10, output voltage $y$ resolves the equation:

(10) $$x = y \cdot f^{-1}(z/y)$$

In Fig. 11, it is the variable voltage $x$ which is applied, from terminals 7—8, to potentiometer 61, to be injected as a mixing voltage in the input of the summation amplifier. The output voltage $y$ is fed back, through the same arrangement as in Fig. 10, to terminals $7^1$ and $8^1$ of feeders 3—4. The terminals 5—6 of feeders 1—2 receive the voltage of variable $z$. According to Relation 2, we have now:

(11) $$y_1 = z \cdot f(y/z)$$

with

(12) $$y_1 = -x$$

as in the preceding case. Hence:

(13) $$x/z = f(y/z)$$

and

(14) $$y/z = f^{-1}(x/z)$$

The output voltage of the simulator is the solution of the equation:

(15) $$y = z \cdot f^{-1}(x/z)$$

Now, in electric simulators of arbitrary functions according to the invention, and more particularly in the case of two variable voltages, special advantages may be had from the provision of a transfer characteristic which follows a parabolic law of order $n$. Fig. 12 represents such a simulator, wherein:

(16) $$y = z \cdot (x/z)^n = x^n \cdot z^{1-n}$$

If we take:

(17) $$n = 1/2 \text{ and } y = (x \cdot z)^{1/2}$$

the output voltage simulates the square root of the product of the applied voltages $x$ and $z$.

On the other hand, if we take:

(18) $$n = 2 \text{ and } y = x^2 \cdot z^{-1}$$

for $x=1$, the output voltage will represent $1/z$:

(19) $$n=2, x=1, y=1/z$$

In Fig. 12, the component circuit elements are designated by the same numerals as in the preceding figs.

Figure 13:
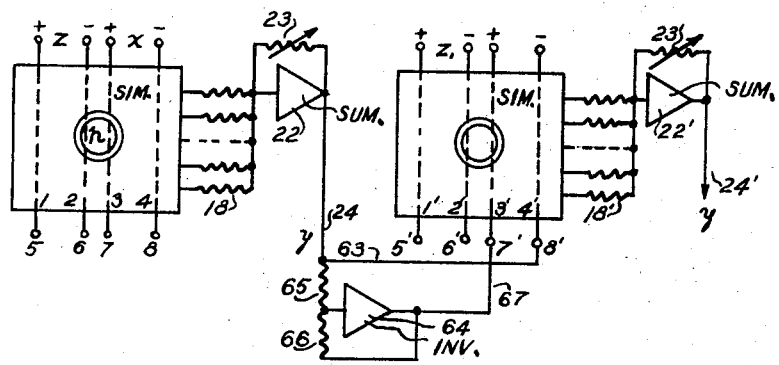
Figs. 13, 14 and 15 show respective arrangements in cascade connection of two electric devices according to the invention so designed as to permit certain elementary computations.
Figure 14:
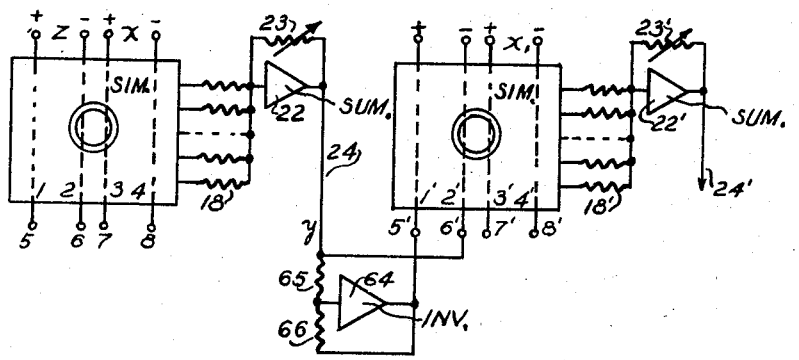

In Figs. 13 and 14, two circuit arrangements are illustrated in which a pair of electric simulator units are connected in cascade relation, the first unit having a transfer characteristic representing a parabolic law of the $n$th order and the second, a transfer characteristic representing a parabolic law of the $m$th order. In Fig. 13, the output 24 of the first simulator unit, $(n)$, is connected to feeders $3^1$ and $4^1$ of the variable voltage $x_1$ of the second unit, $(m)$. The inter-unit coupling circuit comprises a straight-through conductor 63 and a conductor 67 wherein is inserted the inverter amplifier 64, of gain $(-1)$, with its input and feedback resistors 65 and 66. In Fig. 14, output 24 of the first unit is connected to feeders $1^1$ and $2^1$ of variable voltage $x_1$ of the second unit, by means of a similar inter-unit coupling circuit.

The output voltage $y_1$ at output $24^1$ of Fig. 13 is given by the relation:

(20) $$Y_1 = x_1^m \cdot z_1^{1-m}$$

and, as the input voltage $x_1$ is equal to the output voltage $y$ of the first unit at 24,

(21) $$y = x^n \cdot z^{1-n}$$

we have:

(22) $$y_1 = x^{nm} \cdot z^{(1-n)m} \cdot z_1^{1-m}$$

Adjusting the first unit so that $n=1/2$, Relation 22 becomes

(23) $$y_1 = z_1^{1-m} \cdot (x \cdot z)^{m/2}$$

Adjusting the second unit so that $m=2$, Relation 23 becomes

(24) $$n=1/2, m=2, y_1 = (x \cdot z)/z_1$$

or

(25) $$y_1 = x \cdot z \text{ if } z_1 = 1$$

Such a simulator arrangement produces an output voltage which is the product of two incoming voltages.

Relation 24 also becomes:

(26) $$y_1 = z/z_1 \text{ with } x = 1$$

(27) $$y_1 = x/z_1 \text{ with } z = 1$$

Such simulators produce an output voltage which is the quotient of two variable voltages.

Similarly, for the arrangement shown in Fig. 14, the output voltage $y_1$ is:

(28) $$y_1 = x_1^m \cdot z^{n(1-m)} \cdot z^{(1-n)(1-m)}$$

and for $n=1/2$:

(29) $$y_1 = x_1^m \cdot (x \cdot z)^{(1-m)/2}$$

Adjusting the second unit so that its order be $(-1) = m$, Relation 29 becomes:

(30) $$n=1/2, m=-1, y_1 = (x \cdot z)/x_1$$

and, taking one of the three variable voltages $x$, $z$, $x_1$ equal to unity, the same elementary operations of multiplication and division are obtained between two quantities.

Adjusting now $m=3$ in the second unit, with $n=1/2$ in the first unit, we have:

(31) $$m=3, n=1/2, y_1 = x_1^3/(x \cdot z)$$

which arrangement delivers an output voltage representing the voltage:

(32) $$x_1 = 1, y_1 = 1/(x \cdot z)$$

For $x = x_1$ and $z = 1$, such an arrangement will deliver a voltage representing the square of a quantity, and so forth.

It is apparent from the examples such as shown above, that electric simulators according to the invention present a great flexibility of adjustment for elementary computations on quantities represented or simulated by D.C. variable voltages.

Figure 15:
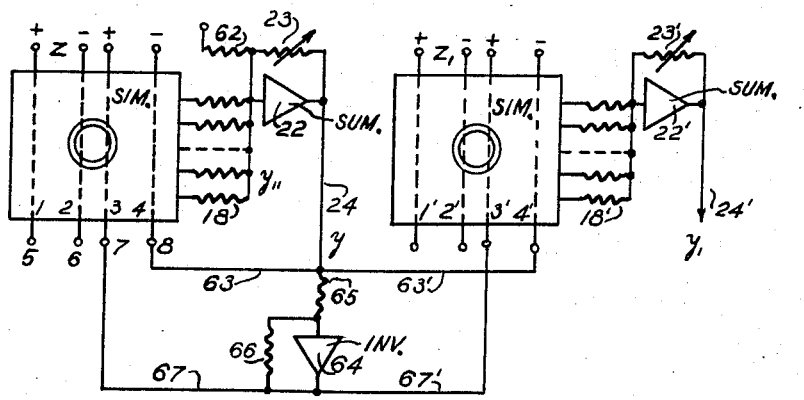

Fig. 15 illustrates a typical case of two cascade-connected simulator units according to the invention, wherein a simulator unit such as shown in Fig. 11 is used as the first unit. Both these units are supposed to have parabolic transfer characteristics of the same order 2, the output voltage $y$ from the first unit being fed back to the feeders 3—4 of the first unit as well as supplied to feeders $3^1$—$4^1$ of the second unit.

$Y_{11}$ denoting the voltage denoted $y_1$ for the Fig. 11 (notation $y_1$ being preserved for the final output voltage of the arrangement of Fig. 15), the relation of transfer for the first unit is:

(33) $$y_{11} = y^2 \cdot z^{-1}$$

and, as $y_{11} = x$, this relation gives the following output voltage of the first unit:

(34) $$y^2 = x \cdot z$$

Such first output voltage being applied as an input voltage $x_1$ on the second unit, the final output voltage $y_1$ is:

(35) $$y_1 = y^2 \cdot z^{-1} = (x \cdot z)/z_1$$

Such an arrangement may deliver as in the case of Fig.

13, an output voltage representing a product or a quotient of two quantities by maintaining one of the component voltages at a value equal to unity.

Figure 16:
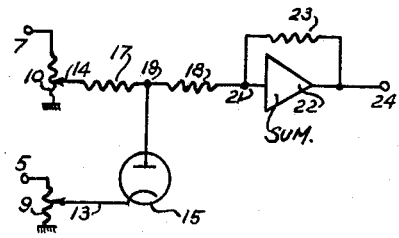
Figs. 16 and 18 show respective modified presentations of elementary simulator stages of the kind disclosed in Fig. 2.
Figure 17:
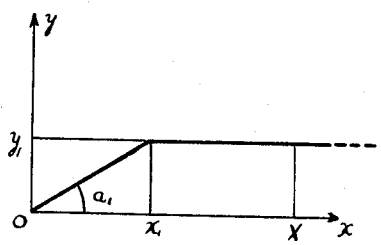
Figs. 17 and 19 show respective representations of the transfer characteristics of the stages of Figs. 16 and 18.
Figure 18:
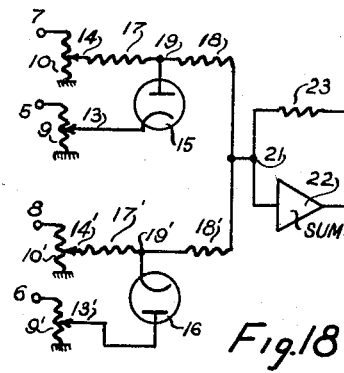

Figs. 16 and 18 represent circuit diagrams of transfer networks which are derived from the diagrams of transfer networks in Fig. 2 by having the circuit components completely separated. Their operation however is the same as for the above-described transfer networks; their transfer characteristics are represented in Figs. 17 and 19.

Referring to Fig. 16, the variable voltage $x$ is applied to input terminal 7 connected to potentiometer 10 the slider 14 of which is connected, through the two series resistors 17 and 18 to input 21 of a summation amplifier 22 provided with feedback resistor 23. The output voltage at 24 will be of opposite polarity to that of the input voltage of the amplifier at 21, a condition which is not taken into consideration in the graphical representations of transfer characteristics in Figs. 17 and 19. Junction point 19 of resistors 17 and 18 is connected to a voltage limiter element, preferably, a diode tube the heater of which is under-heated, and supplied through a relatively high resistance. The variable voltage $x$ being positive at 7, diode 15 has its plate connected to point 19. The cathode of tube 15 is connected to slider 13 of potentiometer 9 which receives on its terminal 5 a positive reference voltage. The potentiometer 10, by adjustment of its slider 14, gives the slope coefficient of the curve portion simulated by such an elementary stage, and potentiometer 9, by adjustment of its slider 13, gives the value of voltage limitation at point 19. In this respect, the following should be noted: denoting $R_1$ the value of resistor 17, and $R_2$ the value of resistor 18, for a voltage value $x$ applied upon input terminal 7, and for an adjustment to unity of the potentiometer (slider 14 on terminal 7), with a voltage limitation fixed at a value $E_0$, it is only necessary to impress upon terminal 5 a voltage value of $E_0/n$, with $n$ denoting the ratio $R_2/(R_1+R_2)$, with respect to the voltage drop in resistor 17; otherwise the whole of potentiometer 9 could not be used. When the values of the resistors 17 and 18 are equal, it will be sufficient to impress to the terminal 5 a constant reference voltage of half the value of the maximum voltage of $x$ on terminal 7.

A transfer stage such as shown in Fig. 16 presents a transfer characteristic such as shown in Fig. 17. For obtaining a transfer characteristic such as shown in Fig. 19, it is required to duplicate the transfer stage of Fig. 16 by a second transfer stage, Fig. 18, to the input terminal 8 of which is applied the same variable voltage $x$, but in negative polarity; this second transfer stage has a diode 16 of reversed connection with respect to diode 15. The slider 14¹ of the variable input potentiometer 10¹ is connected to input point 21 of summation amplifier 22 through series resistors 17¹ and 18¹, which are identical with the resistors 17 and 18, as potentiometer 10¹ is identical to potentiometer 10. Branch point 19¹ is connected to the cathode of a diode 16 the plate of which is connected to slider 13¹ of potentiometer 9¹ which is identical with the potentiometer 9 but which, on its input terminal 6, receives the reference voltage with a negative polarity.

Figure 19:
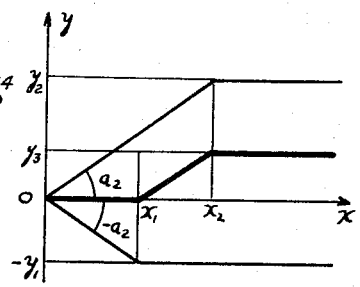
Figure 20:
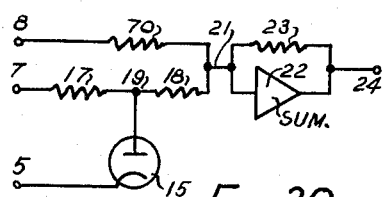
Fig. 20 shows an alternative diagram of an elementary simulator according to Figs. 2 and 18.
Figure 21:
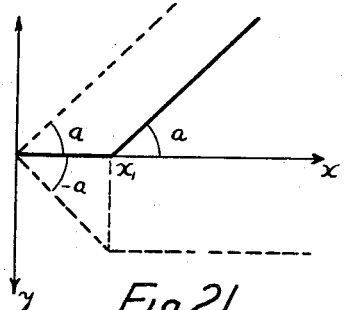
Fig. 21 shows the transfer characteristic of the elementary simulator of Fig. 20.

If now one of the diodes is omitted in the circuit of Fig. 18, the resulting transfer charactertistic is of the kind indicated in Fig. 21—the $y$ axis has been reversed so as to maintain the same polarity convention as in Figs. 17 and 19, as defined by the circuit daigram shown in Fig. 20. In Fig. 20, the potentiometers have also been omitted, the supposed slope being of unity, (45°). A single resistor 70 is shown between terminal 8 and point 21, having a value corresponding, for instance, to the sum of the values of resistors 17¹ and 18¹. Such a transfer characteristic results in an output voltage which remains equal to zero until an abscissa value $x_1$ and, from the point of abscissa $x_1$, the voltage increases linearly. This is due to the fact that, in one branch of the transfer network, the voltage is limited by the action of diode 15.

A transfer stage such as shown in Fig. 20, with many similar stages being associated with a single summation amplifier will give an overall parabolic law to the corresponding simulator unit if the limitation thresholds of the diodes 15 are progressively adjusted at equidistant abscissae $x_1, x_2, x_3, x_4, x_5, \ldots$ whereby the stages present individual transfer characteristics comprising each a linear portion of a single slope value; the sum of these straight line characteristics, as shown in Fig. 22, results in an overall parabolic transfer characteristic. When a single value of slope is used, a single resistor 70 may be provided for a plurality of N transfer stages including limiting diodes, the voltages applied to resistor 70 and to this plurality of transfer stages being of opposite polarities and the value of resistor being equal to $2R/N$, R denoting the value of any one of the resistors 17 and 18 in the transfer stages. For instance, the characteristic shown in Fig. 22 comprises five components, and in this case five transfer stages with limiting diodes must be associated with a single resistor 70, all these transfer networks being connected in common to input 21 of the summation amplifier. Such an arrangement forms a component unit of the circuit disclosed in Fig. 24.

In Fig. 22, by way of illustration, scale values from 0 to 1 have been considered. The adjustments made are such that the linear components start from abscissa points 0.1, 0.3, 0.5, 0.7, 0.9, . . . , respectively.

Generally speaking, the abscissa values by which an arbitrary function $y=f(x)$ must be reduced in straight line component portions with a constant error being maintained in this reduction, may be obtained by graphically plotting curve $$Z(x) = \int_0^x \sqrt{y''}\, dx$$

wherein $y''$ designates the second differentiation of curve $y$, according to a known mathematical notation, and then plotting straight lines parallel to the $O_x$ axis with ordinate values increasing in accordance with arithmetical progression: the abscissa values are those of the intersection points of these curves. For $y=x^2$, for instance, $Z=kx$; for $y=x^3$, $Z=k\sqrt{x^3}$; for $y=e^x$, $Z=k.e^x$; for $y=\mathrm{Log}.x$, $Z=k.\mathrm{Log}\, x$; and so forth.

From another point of view, a simulator such as just described may also be used for the simulation of any function varying uniformly (monotonous), the differentiate function of which is itself of uniform variance, since any function of this kind, when graphically plotted, may be considered as constituted by a straight line of maximum slope from which are subtracted a plurality of half-straight lines of smaller slopes and starting from zero points different from the zero abscissa.

Figure 23:
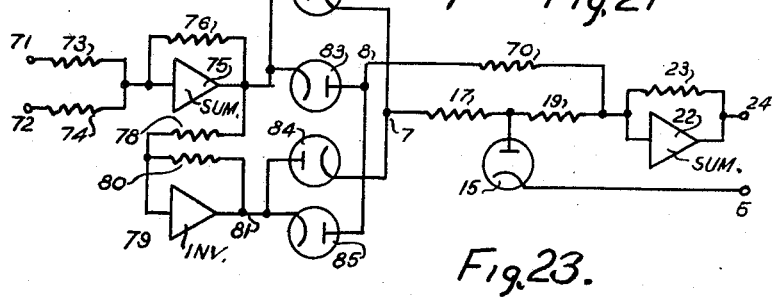
Fig. 23 shows part of an electric simulator of parabolic functions provided with sign discriminating means.
Figure 24:
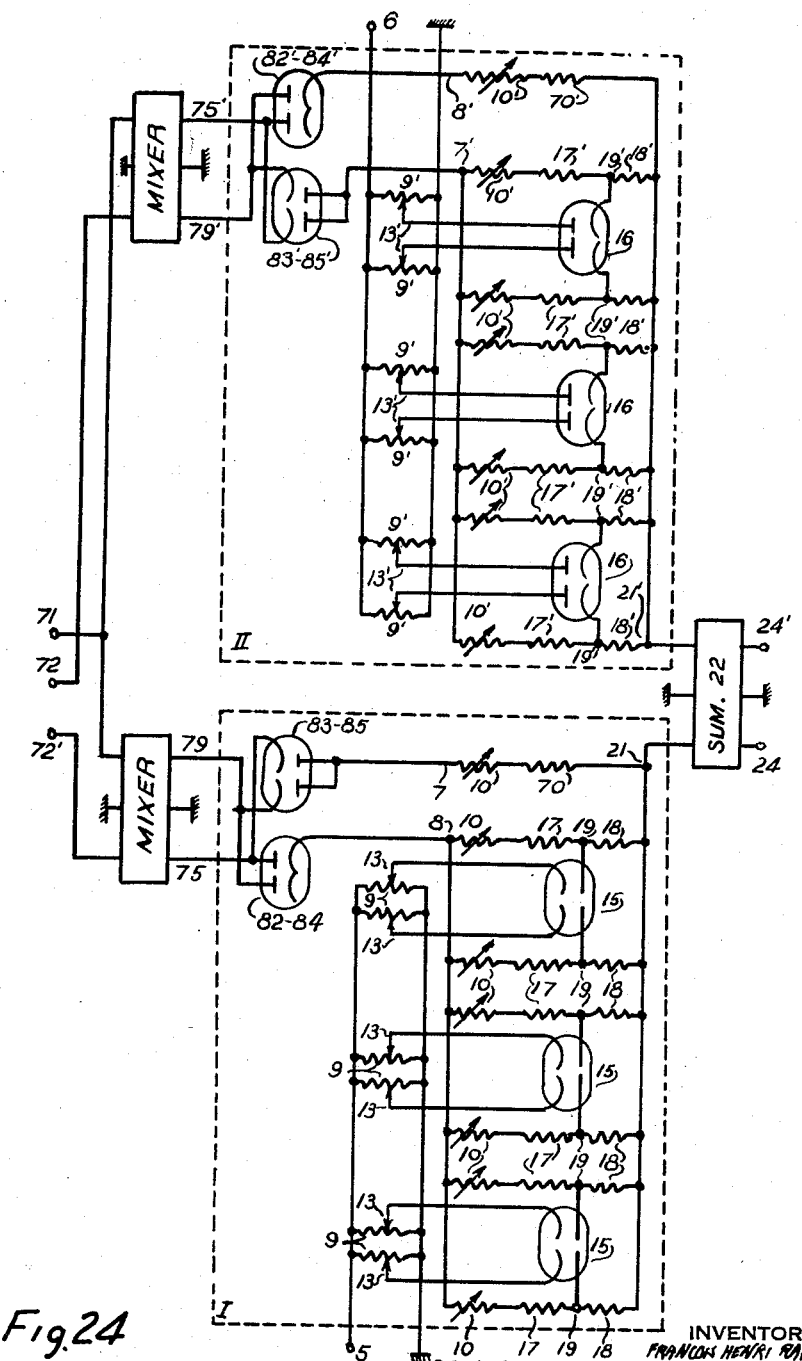
Fig. 24 shows an arrangement combining two simulator units of the kind disclosed in Fig. 23, in order to compute the product of two distinct electrical quantities.

To provide a parabolic law for an electric simulator of the kind described is advantageous for the constitution of elementary analogue computers. In this case, the computers may only consist of such simulator units. Figs. 23 and 24 illustrate how a multiplication operation of two variable quantities $a$ and $b$, represented by electrical voltages, may be obtained, from the use of the well-known relation $(a+b)^2-(a-b)^2 = 4\,a.b$.

Fig. 23 shows a modification of the circuit of Fig. 20 for obtaining an output voltage representing the square of the sum of two quantities $(a+b)^2$. The two voltages representing these quantities are applied, in respective polarities, on input terminals 71 and 72 of resistors 73 and 74 of a summation amplifier 75 provided with feedback resistor 76. The values of resistors 73, 74, 76 are identical.

Output 77 of summation amplifier 75 is applied to resistor 78 forming part of the input mixer of an inverter stage 79 provided with a reinjection or feedback resistor 80, of the same value as that given to both resistors 78 and 80. At the output 81 of stage 79, the resulting voltage represents $(a+b)$ in a definite polarity, for instance positive, denoted $+(a+b)$, and at the output 77 of the summation amplifier 75, the resulting voltage represents $(a+b)$ in the reversed polarity, for instance negative, denoted $-(a+b)$. As usual, the respective gains of stages 75 and 79 are made high and, if required, several amplifier stages are connected in cascade relation in such amplifiers.

Terminal 77 is connected to the plate of a diode 82 and the cathode of a diode 83; terminal 81 is connected to the plate of a diode 84 and the cathode of a diode 85. The cathodes of diodes 82 and 84 are connected to input terminal 7 of the simulator transfer stage which is shown in the drawing. The plates of diodes 83 and 85 are connected to input terminal 8 of the same transfer stage. By means of such a discriminating arrangement, the voltage representing the arithmetical value $(a+b)$ of the sum $(a+b)$ which is an algebraic one, will be applied in positive polarity to 7 and in negative polarity to 8.

It is apparent that irrespective of sign of quantities $(a+b)$ and $(a-b)$ and consequently of the polarity of the voltages representing these quantities, their squares will always be positive and, since the operation merely involves subtracting two voltages representative of these squares, only the arithmetical values of these quantities, for instance, in positive polarity, must be applied to the inputs of the simulator concerned.

The difference $(a-b)$ will be obtained by means of an arrangement similar to that of Fig. 23, but the voltage representing the quantity $b$ will be applied with a reversed polarity with respect to that with which the $b$ voltage is applied in Fig. 23.

Fig. 24, by way of illustration, shows a complete arrangement of a multiplier simulator comprising two simulator units as described above. These units I and II are associated with a common output summation amplifier 86, which is provided with a balanced circuit arrangement as indicated by the ground terminals shown. The numerical references are the same as in the preceding Figs. for the corresponding elements. The variable voltage representing quantity $a$ is applied to terminal 71, the variable voltage representing quantity $b$, to terminal 72 and the voltage representing $-b$, to terminal $72^1$. From the output of the symmetrical or balanced mixer amplifier 75—79, the voltages representing $+(a-b)$ and $-(a-b)$ are applied to pairs of diode discriminators so that the negative voltage $-(a-b)$ is only applied to input 7 of the first simulator unit I and the positive voltage $+(a+b)$ to input 8. The output voltage at 21 of the first unit I represents $(a-b)^2$.

From outputs $75^1$—$79^1$ of the balanced mixer amplifier, the voltages representing $+(a+b)$ and $-(a+b)$ are applied to pairs of diode discriminators so that the negative voltage $-(a+b)$ is applied to input terminal $7^1$ and the positive voltage $+(a+b)$ to input terminal $8^1$ of the second unit II. The output voltage at 21 for the second unit represents $(a+b)^2$.

The voltage resulting from the addition of these output voltages from units I and II represents the value of the product $a.b$, in positive polarity for instance at terminal 24 and in negative polarity at terminal $24^1$. The presetting of respective polarities of the variable and reference voltages in units I and II, of opposite directions gives these units transfer characteristics which are reciprocal images about axis Ox; this also applies to the presetting to identical values of resistors 17—18—$17^1$—$18^1$, potentiometers 9—$9^1$, 10—$10^1$, resistors 70—$70^1$ in both units. The complete arrangement of Fig. 24 thus constitutes an electric simulator of an arbitrary function comprising two parabolic portions (or half-parabolic portions) on either side of axis Ox.

In the above, the transfer characteristic of a simulator according to the invention has been considered as wholly contained in the half-plane of positive variables: the variable $x$ was deemed to vary from 0 to a positive value $x$. The extension of the arrangements described to transfer characteristics contained, at least partly, in the negative half-plane does not involve any change in the circuit diagrams of elementary transfer networks.

Considering for instance the circuit diagram shown in Fig. 16, it is clear that if a negative reference voltage is applied to terminal 5, hence to the cathode of diode 15 this diode will conduct for a negative value of the variable voltage, $-x_1$ applied to terminal 7, and will remain conducting as long as this variable voltage will remain lower than $(x_1)$ and even for positive values of such variable voltage $x$. The output at 21 will be limited to a negative value of voltage. When a summation amplifier receives its voltage input for a set of transfer networks adjusted either to negative limitation voltages and/or positive limitation voltages, the transfer characteristic of the complete simulator (considering a parabolic law) will be such as shown in the lower half-plane of Fig. 25, the $y$ axis being orientated downward. The point, here for $x=1$, where the transfer characteristic passes through zero, is obtained when the negative and positive output values of the transfer stages balance each other. For instance, the voltage limiting value of the transfer stage which is due to be voltage limited for $x=1$ is taken equal to, and of the same arithmetical value as, the arithmetical value of the algebraic sum of the other positive and negative limiting voltages of the other stages.

The transfer characteristic of the upper half-plane in Fig. 25 may be obtained either with the same group of transfer stages as that of the lower half-plane, connected to point 21 with the intercalation of an inverter stage, or with another simulator unit in which the diodes receive the limiting voltages on their plates in such order that these diodes progressively become non-conductive as the reverse voltage of the variable increases.

With such a simulator arrangement, the discrimination of polarities for the input voltages becomes useless so that a polarity discriminator arrangement such as shown in Fig. 24 may be omitted. For the characteristic illustration in Fig. 25, the adjustment is so provided that the transfer characteristics represent the curves:

$$(36) \qquad y = \pm (x-1)^2/2$$

For the first characteristic portion, $x=(a+b)/2$ and for the second portion, $x=(a-b)/2$. By inserting these values in Relation (36), we have:

$$(37) \qquad \frac{\left(\frac{a}{2}+\frac{b}{2}-1\right)^2}{2} - \frac{\left(\frac{a}{2}-\frac{b}{2}-1\right)^2}{2} - \frac{a.b}{4} - \frac{b}{2}$$

and consequently the voltage representing $(-b/2)$ is to be added to the input of the summation amplifier for obtaining a final output voltage varying as the product $a.b$.

Summation amplifiers may be omitted for the derivation of the $(a+b)$ and $(a-b)$ voltages, since a polarity discrimination is useless. As shown in Fig. 26, such sums may be made in the very inputs of the transfer stages, for instance by applying the two variable voltages $a$ and $b$ to the input terminals 71 and 72 of two resistors $17^2$ of the same value and presenting at point 19 the resulting value equal to that of resistor 18.

In case a variable voltage can have its sign reversed a transfer characteristic such as shown in Fig. 27 may be obtained; this elementary transfer characteristic consists of two half-straight lines of opposite slopes on either side of axis Oy. Such a characteristic may be obtained, for instance, with a circuit diagram shown in Fig. 27 wherein each transfer network includes a diode of the same connections and receiving the same reference voltage; such a pair of transfer networks will receive the variable voltage in both polarities, $+x$ and $-x$, of the variable voltage $x$, but these polarities automatically reverse from one input terminal to the other as the variable voltage x changes its own sign. The input voltages $+x$ and $-x$ are the results of the summations of variable voltages $a$ and $b$ upon terminals $71^1$ and $72^1$. With such a circuit arrangement, one of the voltages is never limited when the other is, and consequently one of the transfer networks always plays the part of network 8–70 in Fig. 20 with respect to the other network. With a plurality of such stages, in an arrangement similar to that of units I and II in Fig. 24, the transfer characteristic of the complete simulator unit is a complete parabola.

Reversing the connections of the diodes in an arrangement such as shown in Fig. 27 will result in a transfer characteristic contained in the lower half-plane with respect to axis $Ox$. The parallel arrangement of two such units, with relatively opposite characteristics with respect to origin $O$, and the connection of a balanced symmetrical summation amplifier at their outputs, will result in a simulator wherein the output voltage will represent the product of multiplication of the two input voltages. The output voltage, representing the result, will be obtained with its algebraic sign. In the provision of the second unit, delivering voltage $(a-b)^2$, terminal $71^1$ will, for instance, receive variable voltage $+a$; terminal $72^1$ the variable voltage $-b$ and terminal $71^2$ will receive the variable voltage $-a$ as terminal $72^2$ receives variable voltage $+b$.

We claim:

1. In an electrical simulator of an arbitrary function which has been previously reduced by graphical analysis to a combination of elementary functions each of which represents a portion of straight line of determined slope, means for receiving at least one variable voltage, an array of attenuation networks having inputs connected to said receiving means and each including output means for adjusting said variable voltage to a predetermined ratio of attenuation depending upon coefficients of said elementary functions, other means for receiving at least one reference voltage, another array of attenuation networks having inputs connected to said other receiving means and each including output means for adjusting said reference voltage to a predetermined ratio depending upon other coefficients of said elementary functions, a number of unidirectional conducting means having input and output terminals coupled, respectively, to the reference potential and variable potential outputs of elements of said different arrays of attenuation networks for limiting the output of one element of one array under control of an element of the other array to a predetermined value depending upon said other coefficients of said elementary functions, a summation amplifier having inputs coupled to the outputs of said unidirectional conducting means, at least one additional pair of receiving means, at least one additional pair of arrays of attenuation networks, and at least one additional summation amplifier, said additional elements being interconnected to form at least one additional simulator unit; the output of the summation amplifier of one of said units being coupled to at least one of the receiving means of another of said units.

2. A combination according to claim 1 wherein each simulator unit presents a parabolic transfer characteristic, the output voltages from said units being of reversed polarities.

3. In an electrical simulator of an arbitrary function which has been previously reduced by graphical analysis to a combination of elementary functions each of which represents a portion of straight line of determined slope, means for receiving at least one variable voltage, an array of attenuation networks having inputs connected to said receiving means and each including output means for adjusting said variable voltage to a predetermined ratio of attenuation depending upon coefficients of said elementary functions, other means for receiving at least one reference voltage, another array of attenuation networks having inputs connected to said other receiving means and each including output means for adjusting said reference voltage to a predetermined ratio depending upon other coefficients of said elementary functions, a number of unidirectional conducting means having input and output terminals coupled, respectively, to the reference potential and variable potential outputs of elements of said different arrays of attenuation networks for limiting the output of one element of one array under control of an element of the other array to a predetermined value depending upon said other coefficients of said elementary functions, a summation amplifier having inputs coupled to the outputs of said unidirectional conducting means, at least one additional pair of receiving means, at least one additional pair of arrays of attenuation networks, and at least one additional summation amplifier, said additional elements being interconnected to form at least one additional simulator unit; the output of the summation amplifier of one of said units being coupled to at least one of the receiving means of another of said units, and at least one of the receiving means of one of said units being coupled at least to one of the receiving means of another of said units.

4. In a combination for electric simulation of arbitrary functions, a first pair of feeders for the application of a voltage, and a second pair of feeders for the application of another voltage, an array of voltage transfer networks each including at least one potentiometer connected to said first pair of feeders and having a slider, a summation amplifier, a pair of series connected resistors connected at one end to the slider of said potentiometer and at the other end to the input of said summation amplifier, and at least some of said transfer networks each including a second potentiometer connected to said second pair of feeders and having a slider, at least one unidirectional conducting element connected between the junction point of said series resistors and the slider of said second potentiometer so as to limit the output from said first slider under control of the output of said second slider; said summation amplifier having a feedback circuit including a resistance of at least double the resistance value of said series resistors; the series resistors coupled at least to some of said transfer networks having substantially the same resistance value.

5. In a combination for electric simulation of arbitrary functions, a first pair of feeders for the application of a voltage, and a second pair of feeders for the application of another voltage, an array of voltage transfer networks each including at least one potentiometer connected to said first pair of feeders and having a slider, a summation amplifier, a pair of series connected resistors connected at one end to the slider of said potentiometer and at the other end to the input of said summation amplifier, and at least some of said transfer networks each including a second potentiometer connected to said second pair of feeders and having a slider, at least one unidirectional conducting element connected between the junction point of said series resistors and the slider of said second potentiometer so as to limit the output from said first slider under control of the output of said second slider, at least for some of said potentiometers said series resistors including adjustable tapped-potentiometers.

6. In a combination for electric simulation of arbitrary functions, a first pair of feeders for the application of a voltage, and a second pair of feeders for the application of another voltage, an array of voltage transfer networks each including at least one potentiometer connected to said first pair of feeders and having a slider, a summation amplifier, a pair of series connected resistors connected at one end to the slider of said potentiometer and at the other end to the input of said summation amplifier, and at least some of said transfer networks each including a second potentiometer connected to said second pair of feeders and having a slider, at least one unidirectional conducting element connected between the junction point of said series resistors and the slider of said second potentiometer so as to limit the output from said first slider under control of the output of said second slider, a feedback circuit coupling one pair of feeders with the output of said summation amplifier and including means for translating said output in both polarities, an additional transfer network having an output coupled to the input of said summation amplifier, and means for supplying voltage to said additional transfer network.

7. In a combination for electric simulation of arbitrary functions, a first pair of feeders for the application of a voltage, and a second pair of feeders for the application of another voltage, an array of voltage transfer networks each including at least one potentiometer connected to said first pair of feeders and having a slider, a summation amplifier, a pair of series connected resistors connected at one end to the slider of said potentiometer and at the other end to the input of said summation amplifier, and at least some of said transfer networks each including a second potentiometer connected to said second pair of feeders and having a slider, at least one unidirectional conducting element connected between the junction point of said series resistors and the slider of said second potentiometer so as to limit the output from said first slider under control of the output of said second slider; means for supplying to one pair of feeders a variable direct current voltage and to the other pair of feeders a variable direct current voltage, a feedback circuit coupled to the output of said summation amplifier and including means for translating said output of said summation amplifier in both polarities; an additional transfer network having an output coupled to the input of said summation amplifier; and means for supplying another variable direct current voltage to said additional transfer network and a reference direct current voltage to the other pair of feeders.

8. In a combination for electric simulation of arbitrary functions, a first pair of feeders for the application of a voltage, and a second pair of feeders for the application of another voltage, an array of voltage transfer networks each including at least one potentiometer connected to said first pair of feeders and having a slider, a summation amplifier, a pair of series connected resistors connected at one end to the slider of said potentiometer and at the other end to the input of said summation amplifier, and at least some of said transfer networks each including a second potentiometer connected to said second pair of feeders and having a slider, at least one unidirectional conducting element connected between the junction point of said series resistors and the slider of said second potentiometer so as to limit the output from said first slider under control of the output of said second slider; at least some of said transfer networks not provided with unidirectional elements including a single series resistor network having a resistance value substantially equal to the minimum value of the series resistors in the other transfer networks divided by the number of said other transfer networks.

9. In an electric simulator of an arbitrary function which has been previously reduced by graphical analysis to a combination of elementary functions each of which represents a portion of straight line of determined slope, at least two attenuation networks and means for supplying reference and variable voltages to said networks, each of said networks including means for adjusting said voltages to a predetermined ratio of attenuation depending upon coefficients of said elementary functions, a summation amplifier, at least two series connected resistors connected between the output of one of said networks and the input of said summation amplifier, and at least one unidirectional element coupled between the junction point of said resistors and the output of the other of said networks so as to limit the output of said first network to a predetermined value depending upon the output of the other network; said summation amplifier having a feedback circuit including a resistor having at least twice the resistance of said series connected resistors.

10. In an electric simulator of an arbitrary function which has been previously reduced by graphical analysis to a combination of elementary functions each of which represents a portion of straight line of determined slope, at least two attenuation networks and means for supplying reference and variable voltages to said networks, each of said networks including means for adjusting said voltages to a predetermined ratio of attenuation depending upon coefficients of said elementary functions, a summation amplifier, at least two series connected resistors connected between the output of one of said networks and the input of said summation amplifier, and at least one unidirectional element coupled between the junction point of said resistors and the output of the other of said networks so as to limit the output of said first network to a predetermined value depending upon the output of the other network, other voltage supply means, at least one additional attenuation network having an input coupled to said other supply means and an output coupled to said summation amplifier, said summation amplifier having a feedback circuit coupled to said first voltage supply means.

11. In an electric simulator of an arbitrary function which has been previously reduced by graphical analysis to a combination of elementary functions each of which represents a portion of straight line of determined slope, at least two attenuation networks and means for supplying reference and variable voltages to said networks each of said networks including means for adjusting said voltages to a predetermined ratio of attenuation depending upon coefficients of said elementary functions, a summation amplifier, at least two series connected resistors connected between the output of one of said networks and the input of said summation amplifier, and at least one unidirectional element coupled between the junction point of said resistors and the output of the other of said networks so as to limit the output of said first network to the predetermined value depending upon the output of the other network; and at least one attenuation network not connected to unidirectional elements and a single series resistor network connecting said attenuation network to the amplifier input.

12. In an electric simulator for obtaining an output voltage representing the square of the sum of two quantities, a pair of summation amplifiers, means in series with a pair of resistors for applying voltages corresponding to said quantities to the input of one of said summation amplifiers; two pair of uniconducting means, and means including a resistance path and a pair of series connected resistors for connecting the output of the first summing amplifier in opposite polarities over the elements of each uniconducting pair, respectively, to the input of the second summation amplifier, other voltage supplying means and other unidirectional means connecting the junction point of said series connected resistors to said other voltage supplying means.

No references cited.